No. 782,584. PATENTED FEB. 14, 1905.
S. M. SHOEMAKER.
ATTACHMENT FOR ICE CREAM FREEZERS.
APPLICATION FILED MAY 14, 1904.
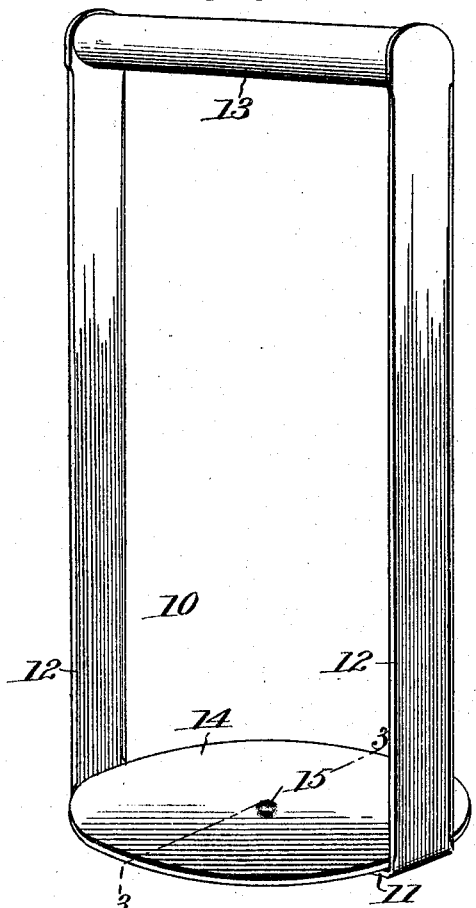
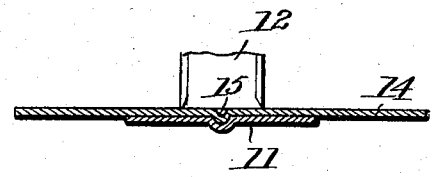
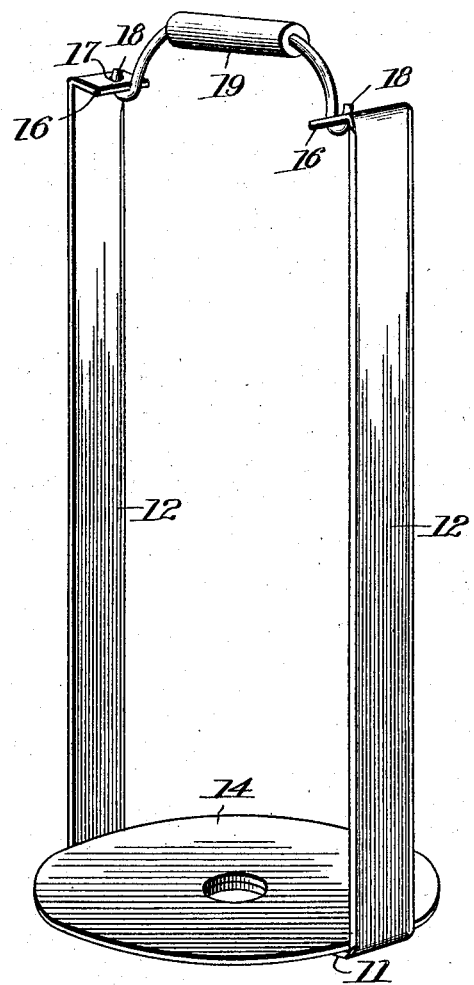
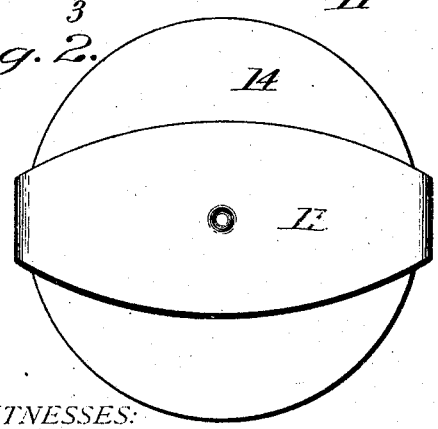
WITNESSES:
C. H. Walker.
Wm. S. Hodges.
INVENTOR
Stella M. Shoemaker
BY
Walter S. Dandy,
Attorney No. 782,584. Patented February 14, 1905.

UNITED STATES PATENT OFFICE.

STELLA MERCER SHOEMAKER, OF WILKESBARRE, PENNSYLVANIA.

ATTACHMENT FOR ICE-CREAM FREEZERS.

SPECIFICATION forming part of Letters Patent No. 782,584, dated February 14, 1905.

Application filed May 14, 1904. Serial No. 207,927.

*To all whom it may concern:*

Be it known that I, STELLA MERCER SHOEMAKER, of Wilkesbarre, in the county of Luzerne and State of Pennsylvania, have invented certain new and useful Improvements in Attachments for Ice-Cream Freezers; and I do hereby declare the following to be a full, clear, and exact description of the invention, such as will enable others skilled in the art to which it appertains to make and use the same.

This invention contemplates certain new and useful improvements in attachments for ice-cream freezers.

The invention has for its object the production of a simple and inexpensive device of this character by means of which ice-cream may be withdrawn from the freezer in a solid block.

A further object is to provide means for readily separating the cream from the sides of the can or freezer, whereby the withdrawal of the frozen block is greatly facilitated.

In carrying out my invention I provide an ejector adapted to rest on the bottom of the freezer and provided with sides or scrapers adapted to contact with the interior wall of the freezer. A disk or plate conforming to the contour of the freezer rests upon the base of the ejector and serves as a support for the ice-cream when the same is withdrawn after freezing. A suitable handle is provided whereby the ejector may be rotated within the freezer and readily withdrawn therefrom.

The invention will be hereinafter fully set forth, and particularly pointed out in the claims.

In the accompanying drawings, Figure 1 is a view in perspective illustrating my improved attachment for ice-cream freezers. Fig. 2 is a bottom plan view thereof. Fig. 3 is a detail sectional view on the line 3 3, Fig. 1. Fig. 4 is a view of a slight modification.

Referring to the drawings, 10 designates my improved ejector, the same comprising a base 11, provided with knife-like sides or scrapers 12, united at their upper ends by a cross-piece or handle 13. The base 11 is slightly widened to form a bearing or support for a disk 14. If desired, said disk may be provided with a lug 15, adapted to fit within a corresponding socket in the base 11.

In practice my improved ejector is placed within an ice-cream freezer with the base resting on the bottom thereof, the disk 14 resting upon said base. The material to be frozen is then placed in the freezer and may be frozen in any of the well-known ways of freezing without the employment of dashers. When frozen and it is desired to remove the cream, the ejector is rotated through the medium of the handle 13, whereupon the knife-like sides will scrape the inner wall of the freezer, separating the frozen cream therefrom. The ejector is then withdrawn by said handle, effecting a corresponding withdrawal of the cream in a solid block, the latter being firmly supported upon the disk 14 and between the sides 12.

In Fig. 4 I have illustrated a slight modification of my invention intended for use in connection with the class of freezers employing dashers. In this form of my invention the sides 11 are turned over at the top to form lugs 16, which latter are provided with holes or openings 17, adapted to receive the hook-like ends 18 of a removable handle 19. Said hook-like ends are formed of spring material, the handle being somewhat wider than the space between the lugs, whereby it will automatically retain itself in position. In this form the base 11 and disk 14 are perforated to receive the lug of the dasher. In operation the ejector is placed within the freezer, after which the dasher is placed in position and the cream frozen in the usual manner. To eject the cream, the dasher is withdrawn and the handle 19 engaged with the lugs 16. The ejector is then operated in the manner heretofore described.

The advantages of my improved ejector will be at once apparent to those skilled in the art to which it appertains. It will be readily observed that by means thereof the cream is readily separated from the inner wall of the freezer and may be readily withdrawn from the latter in a solid block.

I am aware that it is not broadly new to employ ejectors to withdraw ice-cream from freezers in solid blocks; but I am the first, so far as I am aware, to provide such ejectors with means for separating the cream from the wall of the freezer.

I claim as my invention—

1. A device of the character described, comprising a base, an operating-handle therefor, and an independent disk or plate adapted to rest on said base and in rotatable relation therewith.

2. A device of the character described, comprising a base, provided with knife-like sides or scrapers, and an operating-handle uniting the free ends of said sides or scrapers.

3. A device of the character described, comprising a base provided with knife-like sides or scrapers, an operating-handle therefor, and an independent disk or plate adapted to rest on said base and in rotatable relation therewith.

4. A device of the character described, comprising a base provided with knife-like sides or scrapers, lugs formed on the latter, a detachable handle adapted to engage said lugs, and a disk or plate adapted to rest on said base.

5. A device of the character described, comprising a base provided with knife-like sides or scrapers, and a removable handle adapted to engage the free ends of said sides or scrapers.

6. A device of the character described comprising a base, an operating-handle therefor, a disk or plate adapted to rest on said base, and means for holding said disk and base in rotatable juxtaposition.

In testimony whereof I have signed this specification in the presence of two subscribing witnesses.

STELLA MERCER SHOEMAKER.

Witnesses:
ANN M. STRUTHERS,
B. L. CLARKE.